United States Patent [19]

Takizawa et al.

[11] 4,038,959
[45] Aug. 2, 1977

[54] INTERNAL COMBUSTION ENGINE WITH A SUBSIDIARY COMBUSTION CHAMBER

[75] Inventors: Masaaki Takizawa, Mishima; Tsutomu Hiyoshi, Susono, both of Japan

[73] Assignee: Toyota Jidosha Kogyo Kabushiki Kaisha, Toyota, Japan

[21] Appl. No.: 694,710

[22] Filed: June 10, 1976

[30] Foreign Application Priority Data

Mar. 17, 1976 Japan .............. 51-31001[U]

[51] Int. Cl.² .................. F02B 23/00; F02B 3/00
[52] U.S. Cl. .................. 123/191 S; 123/32 L; 123/32 SP; 123/191 R; 123/191 SP
[58] Field of Search .......... 123/30 D, 32 R, 32 C, 123/32 D, 32 K, 32 L, 32 ST, 32 SP, 33 D, 191 R, 191 M, 191 S, 191 SP

[56] References Cited

U.S. PATENT DOCUMENTS

| 1,787,326 | 12/1930 | Sanders | 123/30 D |
|---|---|---|---|
| 2,089,577 | 8/1937 | Sanders | 123/32 C |
| 2,173,081 | 9/1939 | Barkeij | 123/32 SP |
| 2,379,190 | 7/1945 | Sanders | 123/32 C |
| 3,980,060 | 9/1976 | Noguchi | 123/32 ST |
| 3,982,504 | 9/1976 | Noguchi | 123/32 L |

FOREIGN PATENT DOCUMENTS 645,221  10/1950  United Kingdom ....... 123/32 C

Primary Examiner—Carroll B. Dority, Jr.
Assistant Examiner—William Randolph
Attorney, Agent, or Firm—Stevens, Davis, Miller & Mosher

[57] ABSTRACT

An internal combustion engine comprising a main combustion chamber and a subsidiary combustion chamber having a spark plug. The subsidiary combustion chamber comprising a restricted opening, a first chamber and a second chamber, said chambers being interconnected by the restricted opening. The first chamber has at least two connecting passages communicating the main combustion chamber and the first chamber. One of the connecting passages is directed to the intake valve. The spark gap of the spark plug is located in the first chamber.

5 Claims, 1 Drawing Figure

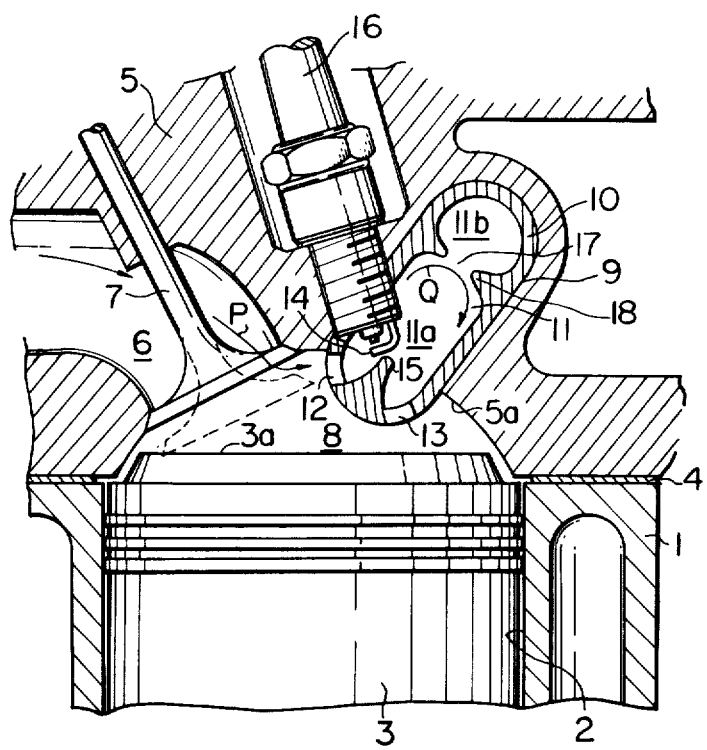

INTERNAL COMBUSTION ENGINE WITH A SUBSIDIARY COMBUSTION CHAMBER

DESCRIPTION OF THE INVENTION

The present invention relates to an internal combustion engine with a subsidiary combustion chamber, and particularly relates to an internal combustion engine with a subsidiary combustion chamber in which a combustion chamber comprises a main combustion chamber and a subsidiary combustion chamber equipped with a spark plug, said chambers being interconnected via a connecting passage, A uniform mixture fed into the main combustion chamber is introduced into the subsidiary combustion chamber, and then the introduced mixture is ignited in the subsidiary combustion chamber.

In an internal combustion engine of this type, at the time of the intake stroke of the engine, a mixture is fed into the main combustion chamber via an intake valve, and, at the time of the compression stroke, the mixture is introduced into the subsidiary combustion chamber, Then the introduced mixture in the subsidiary combustion chamber is ignited and a high velocity burning jet is injected into the main combustion chamber via the connecting passage, thereby effectively burning the mixture in the main combustion chamber by the high velocity burning jet.

In an internal combustion engine of this type, the particular problems are how to scavenge the subsidiary combustion chamber, how to inject a high velocity burning jet having the strength corresponding to the level of load of the engine from the subsidiary combustion chamber, and how to control the combustion in the main combustion chamber in order to prevent the production of $NO_x$, particularly when the engine is operating under a heavy load. However, if the volume of the subsidiary combustion chamber is increased in order to obtain a stronger burning jet when the engine is operating under a heavy load, a sufficient scavenging operation in the subsidiary combustion chamber cannot be obtained when the engine is operating under a light load. Contrary to this, if the volume of the subsidiary combustion chamber is reduced in order to obtain a sufficient scavenging operation in the subsidiary combustion chamber when the engine is operating under a light load, a strong burning jet cannot be obtained when the engine is operating under a heavy load.

In the past, a number of subsidiary combustion chambers respectively having various separate constructions have been proposed. However, there has not yet been proposed subsidiary combustion chamber which solves all of the above-mentioned three problems.

An object of the present invention is to provide an internal combustion engine equipped with a subsidiary combustion chamber having a novel construction by which these three problems can be solved.

According to the present invention, an internal combustion engine, comprises a cylinder block, a piston reciprocably movable in the cylinder block, a cylinder head fixed onto the cylinder block and having an intake valve, a main combustion chamber formed between the inner surface of the cylinder head and the top surface of the piston, a subsidiary combustion chamber disposed in the cylinder head and comprising restricted opening means, a first chamber located in the vicinity of the main combustion chamber and a second chamber located remote from the main combustion chamber, said first and second chambers being interconnected via said restricted opening means, and an ignition plug having an ignition gap located in the first chamber, said first chamber having at least two connecting passages communicating the first chamber and the main combustion chamber, one of said connecting passages being directed to the intake valve so that a part of an air-fuel mixture fed into the main combustion chamber through the intake valve is introduced into the first chamber when the engine is operating under a heavy load, said second chamber on one hand storing a residual gas introduced thereinto from the first chamber through said restricted opening means at the time of the compression stroke when the engine is operating under a light load. On the other hand, receiving a combustible gas thereinto from the first chamber through said restricted opening means at the time of the compression stroke so that the combustible gas is ignited by the combustion gas in the first chamber when the engine is operating under a heavy load, said restricted opening means delaying a start of the combustion in the second chamber compared with that of the combustion in the first chamber when the engine is operating under a heavy load.

The above-mentioned object of the present invention may be more fully understood from the following descriptions of a preferred embodiment of the invention, together with the accompanying drawing.

BRIEF DESCRIPTION OF THE DRAWING

In the drawing:

The FIGURE is a cross-sectional side view of an internal combustion engine with a subsidiary combustion chamber according to the present invention.

DESCRIPTION OF A PREFERRED EMBODIMENT

Referring to the Figure, an internal combustion engine with a subsidiary combustion chamber comprises a cylinder block 1, a piston 3 reciprocably movable in a cylinder 2 formed in the cylinder block 1, a cylinder head 5 fixed onto the cylinder block 1 via a gasket 4, an intake valve 7 for controlling an opening operation of an intake port 6, an exhaust valve (not shown), a main combustion chamber 8 formed by the inner wall 5a of the cylinder head 5, the top surface 3a of the piston 3 and of the inner wall of the cylinder 2, a subsidiary chamber component 10 press-fitted into a recess 9 formed in the cylinder head 5, and a subsidiary combustion chamber 11 formed in the subsidiary chamber component 10. According to the present invention, the subsidiary combustion chamber 11 comprises a first subsidiary combustion chamber 11a and a second subsidiary combustion chamber 11b. The first subsidiary combustion chamber 11a is connected to the main combustion chamber 8 via two separate connecting passages 12 and 13, and the connecting passage 12 is directed to the intake valve 7. That is to say, the connecting passage 12 is arranged so as to be able to receive an intake air stream P, the stream direction of which is changed by the valve head of the intake valve 7 after the intake air passes through the intake port 6. On the other hand, it is preferable that the connecting passage 13 be arranged so as to be directed to the top surface 3a of the piston 3. An annular raised portion 18 is formed on the inner wall defining the subsidiary combustion 11, and thus a restricted opening 17 is formed by an annular raised portion 18. The first subsidiary combustion chamber 11a is connected to the second subsidiary combustion chamber 11b via the restricted opening 17. A spark plug 16 is screwed into the cylinder head 5 so that the spark gap 14 of the spark plug 16 is located in the vicinity of the connecting passage 12 in the first subsidiary combustion chamber 11a. However, the spark gap 14 of the spark plug 16 may be located in any other position in the first subsidiary combustion chamber 11a.

The operation of the internal combustion engine according to the present invention is described as below by dividing the operating condition of the engine into two cases.

1. In the case where the engine is operating under a light load.

Immediately before the intake stroke begins, the main combustion chamber 8, the first and the second subsidiary combustion chambers 11a, 11b are filled with a residual gas. Then, the intake valve 7 is opened, whereby a uniform air-fuel mixture, for example, a lean air-fuel mixture is introduced into the main combustion chamber 8. At this time, the velocity of the air-fuel mixture flowing into the intake port 6 is very slow. Consequently, the air-fuel mixture is scarcely introduced into the first subsidiary combustion chamber 11a via the connecting passage 12, and a large part of the air-fuel mixture is introduced into the main combustion chamber 8. Therefore, at the time of completion of the intake stroke, the main combustion chamber 8 is filled with a combustible gas consisting of the air-fuel mixture and the residual gas, and on the other hand the first and the second subsidiary combustion chambers 11a, 11b are filled with the residual gas. During the compression stroke, the combustible gas in the main combustion chamber 8 is pushed into the first subsidiary combustion chamber 11a through the connecting passages 12, 13, whereby the residual gas in the first subsidiary combustion chamber 11a is pushed into the second subsidiary combustion chamber 11b. Thus, at the time of a completion of the compression stroke, the main combustion chamber 8 and the first subsidiary combustion chamber 11a are filled with a combustible gas. On the other hand, the second subsidiary combustion 11b is filled with the residual gas. Then, the combustible gas in the first subsidiary combustion chamber 11a is ignited and thus a high velocity burning jet is injected into the main combustion chamber 8 via the connecting passages 12 and 13. When the engine is operating under a light load, an extremely strong burning jet is not required. Consequently, it is sufficient to burn the combustible gas contained in the volume of the first subsidiary combustion chamber 11a.

As is apparent from the above description, when the engine is operated under a light load, the second subsidiary combustion chamber 11b is used as a chamber for storing the residual gas. On the other hand, the first subsidiary combustion chamber 11a used for forming a high velocity burning jet can be completely scavenged by the combustible gas in the main combustion chamber 8, thus considerably facilitating the ignition of the combustible gas in the first subsidiary combustion chamber 11a.

2. In the case where the engine is operating under a heavy load.

Immediately before the intake stroke begins, the main combustion chamber 8, the first and the second subsidiary combustion chambers 11a, 11b are filled with a residual gas. Then, the intake valve 7 is opened, whereby an air-fuel mixture is introduced into the main combustion chamber 8. At this time, the velocity of the air-fuel mixture flowing into the intake port 6 is very high. Consequently, a part of the air-fuel mixture is introduced into the first subsidiary combustion chamber 11a via the connecting passage 12 as shown by the arrow P and then this air-fuel mixture is turned along the inner wall defining the first subsidiary combustion 11a as shown by the arrow Q. An optional wall 15 may be provided for only guiding the flow of the air-fuel mixture. Thus, the residual gas in the first subsidiary combustion chamber 11a and a part of the residual gas in the second subsidiary combustion chamber 11b is delivered into the main combustion chamber 8, and thus the first subsidiary combustion chamber 11a is filled with the combustible gas. Consequently, at the time of completion of the intake stroke, the main combustion chamber 8 is filled with a combustible gas consisting of the air-fuel mixture and the residual gas, the first subsidiary combustion chamber 11a is filled with a combustible gas, and the second subsidiary combustion chamber 11b is almost filled with the residual gas. In the compression stroke, the combustible gas in the main combustion chamber 8 is pushed into the first subsidiary combustion chamber 11a, and the combustible gas in the first subsidiary combustion chamber 11a is pushed into the second subsidiary combustion chamber 11b. Consequently, the second subsidiary combustion chamber 11b is filled with a combustible gas consisting of the air-fuel mixture and the residual gas. Thus, at the time of completion of the compression stroke, the main combustion chamber 8, the first and the second subsidiary combustion chambers 11a and 11b are filled with the combustible gas. Then, the combustible gas in the first subsidiary combustion chamber 11a is ignited, whereby a high velocity burning jet is injected into the main combustion chamber 8 via the connecting passages 12 and 13. After the combustion in the first subsidiary combustion chamber 11a advances, the combustible gas in the second subsidiary combustion chamber 11b is ignited by the combustion gas in the first subsidiary combustion chamber 11a through the restricted opening 17. Then, a high velocity burning jet created by the combustion of the combustible gas in the second subsidiary combustion chamber 11b is injected into the main combustion chamber 8 via the connecting passages 12 and 13.

As is apparent from the above description, when the engine is operating under a heavy load, since the combustible gas obtained in the volume of the first and the second subsidiary combustion chambers 11a and 11b is burned, an extremely strong burning jet can be obtained.

If the combustible gases contained in the first and the second subsidiary combustion chambers 11a and 11b are simultaneously burned, the temperature and the pressure increase greatly, whereby a large amount of $NO_x$ would be produced. However, according to the present invention, since the start of the combustion of the combustible gas in the second subsidiary combustion chamber 11b is delayed with respect to a start of the combustion of the combustible gas in the first subsidiary combustion chamber 11a, the temperature and the pressure in the first and the second subsidiary combustion chambers 11a and 11b do not increase very much. Consequently, a high velocity burning jet fed into the main combustion chamber 8 via the connecting passages 12 and 13 continues to be injected for a long time, whereby the high velocity burning jet continues to cause promotion of combustion in the main combustion chamber by the time when the combustion in the main combustion chamber is completed. Furthermore, as is aforementioned, by controlling the combustion of the combustible gas in the first and the second subsidiary combustion chambers 11a and 11b, it is possible to reduce the amount of the production of $NO_x$.

As is apparent from the above description, the combustion is controlled by the throttle function of the restricted opening 17. Consequently, instead of the restricted opening 17, any other means having a throttle function, for example, a number of small openings can be used.

According to the present invention, the ease of ignition is improved since the subsidiary combustion chamber used for the combustion can be completely scavenged. Further, good combustion in the main combustion chamber is obtained since it is possible to form a high velocity burning jet having a strength corresponding to the level of load of the engine. In addition, the amount of the harmful component $NO_x$ in the exhaust gas is reduced.

What is claimed is:

1. An internal combustion engine comprising:
   a cylinder block;
   a piston reciprocably movable in the cylinder block;
   a cylinder head fixed onto the cylinder block and having an intake valve;
   a main combustion chamber formed between the inner surface of the cylinder head and the top surface of the piston;
   a subsidiary combustion chamber disposed in the cylinder head and comprising restricted opening means, a first chamber located in the vicinity of the main combustion chamber and a second chamber located remote from the main combustion chamber, said first and second chambers being interconnected via said restricted opening means, and an ignition plug having an ignition gap located in the first chamber, said first chamber having at least two connecting passages communicating the first chamber and the main combustion chamber, one of said connecting passages being directed to an intake valve so that a part of an air-fuel mixture fed into the main combustion chamber through the intake valve is introduced into the first chamber when the engine is operating under a heavy load, said second chamber on one hand storing a residual gas introduced thereinto from the first chamber through said restricted opening means at the time of the compression stroke when the engine is operating under a light load, and on the other hand, receiving a combustible gas thereinto from the first chamber through said restricted opening means at the time of the compression stroke so that the combustible gas is ignited by the combustion gas in the first chamber when the engine is operating under a heavy load, said restricted opening means delaying a start of the combustion in the second chamber compared with the combustion in the first chamber when the engine is operating under a heavy load.

2. An internal combustion engine as recited in claim 1, wherein said restricted opening means comprises an annular raised portion projecting from an inner surface of the subsidiary combustion chamber.

3. An internal combustion engine as recited in claim 1, wherein the connecting passages are arranged on one end of the first chamber near the main combustion chamber, and said restricted opening means is arranged on the other end of the first chamber remote from the main combustion chamber, the subsidiary combustion chamber having a central axis, said connecting passages being symmetrically arranged with respect to the central axis.

4. An internal combustion engine as recited in claim 3, wherein a separating wall for guiding the flow of the air-fuel mixture is formed on an inner wall of the first chamber between the connecting passages.

5. An internal combustion engine as recited in claim 1, wherein the spark gap of the spark plug is located in the first chamber in the vicinity of the connecting passage directed to the intake valve.

* * * * *